United States Patent
Foesser

(10) Patent No.: US 8,550,341 B2
(45) Date of Patent: Oct. 8, 2013

(54) METHOD, A SYSTEM AND A MICROCONTROLLER CARD FOR COMMUNICATING APPLICATION SERVICES FROM A MICROCONTROLLER CARD TO A TERMINAL

(75) Inventor: Christophe Foesser, La Ciotat (FR)

(73) Assignee: Gemalto SA, Meudon (FR)

( * ) Notice: Subject to any disclaimer, the term of this patent is extended or adjusted under 35 U.S.C. 154(b) by 1161 days.

(21) Appl. No.: 11/791,846

(22) PCT Filed: Nov. 14, 2005

(86) PCT No.: PCT/EP2005/055967
§ 371 (c)(1),
(2), (4) Date: Jul. 21, 2008

(87) PCT Pub. No.: WO2006/058839
PCT Pub. Date: Jun. 8, 2006

(65) Prior Publication Data
US 2009/0020603 A1    Jan. 22, 2009

(30) Foreign Application Priority Data
Nov. 30, 2004    (FR) ..................... 04 12702

(51) Int. Cl.
G06F 17/00    (2006.01)
G06F 3/00     (2006.01)
G06K 5/00     (2006.01)
G06K 7/08     (2006.01)
G06K 19/00    (2006.01)
G06K 19/06    (2006.01)

(52) U.S. Cl.
USPC ........... 235/380; 235/375; 235/451; 235/492; 235/487; 710/5; 710/8; 710/11; 710/15

(58) Field of Classification Search
USPC .......... 235/375, 380, 451, 492, 487; 710/8, 5, 710/11, 15, 31, 100, 110, 48
See application file for complete search history.

(56) References Cited

U.S. PATENT DOCUMENTS 6,157,966 A    12/2000  Montgomery et al.
7,600,228 B2 *  10/2009  Takekawa et al. ............ 717/178
(Continued)

FOREIGN PATENT DOCUMENTS

WO    00/69183 A2    11/2000

OTHER PUBLICATIONS

International Search Report dated Dec. 15, 2005.
(Continued)

*Primary Examiner* — Daniel Hess
*Assistant Examiner* — Laura Gudorf
(74) *Attorney, Agent, or Firm* — Buchanan Ingersoll & Rooney PC

(57) ABSTRACT

A method wherein at least one service of an application stored in a microcontroller card is communicated to a terminal. The terminal transmits a command identifying the selected application to the card immediately after selecting the application. In order to reduce in the card the time for accessing the application service data by the terminal, a reply generator in the card selects the active services related to the application in the card in response to the command, and dynamically establishes a list of data identifying these services, to transmit a reply message including the identification data from the card to the terminal. A reply analyzer in the terminal analyzes the identification data of the reply message to communicate the at least one service of the application identified by the identification data.

16 Claims, 4 Drawing Sheets

(56) References Cited

U.S. PATENT DOCUMENTS

| | | | |
|---|---|---|---|
| 2004/0026517 A1* | 2/2004 | Moller et al. | 235/492 |
| 2004/0140351 A1* | 7/2004 | Flugge et al. | 235/382 |
| 2004/0162932 A1* | 8/2004 | Mizushima et al. | 711/103 |
| 2004/0232247 A1 | 11/2004 | Tsunoda et al. | |
| 2005/0188360 A1* | 8/2005 | de Jong | 717/136 |

OTHER PUBLICATIONS

Written Opinion of the International Searching Authority.

\* cited by examiner

METHOD, A SYSTEM AND A MICROCONTROLLER CARD FOR COMMUNICATING APPLICATION SERVICES FROM A MICROCONTROLLER CARD TO A TERMINAL

BACKGROUND OF THE INVENTION

The present invention relates to communicating services to a terminal, which services relate to an application stored in a microcontroller card, also referred to as a "smart card" or as an "integrated circuit card".

The terminal receives the smart card and can, in a first example, be a mobile radio terminal for which the smart card is of the Universal Integrated Circuit Card (UICC) type. For example, the smart card is a Subscriber Identity Module (SIM) for a cellular radiocommunications network of the Global System for Mobile Communications (GSM) type, or a Universal SIM (USIM) for a Code Division Multiple Access (CDMA) network of the third generation ($3^{rd}$ Generation Partnership Project (3GPP)) of the Universal Mobile Telecommunications System (UMTS) type. In other examples, the terminal can be a bank terminal receiving a debit or credit card, or a Personal Computer (PC) equipped with a smart card reader, or indeed a small item of communicating equipment such as a Personal Digital Assistant (PDA) that can read a smart card inserted into it.

In general, a microcontroller card that implements one or more applications, each of which is associated with one or more services cannot transmit data relating to the services proposed by an application directly to the terminal. The link between the terminal and the card is a master-slave link in which the terminal is the master and the card is the slave. The data exchanged between the card and the terminal is exchanged using a dedicated communications protocol in compliance with the ISO 7816-3 Standard. The card uses a mechanism of the proactive type in order to trigger actions in the terminal which periodically interrogates or "polls" the card.

In that type of link, the terminal discovers itself the services that can be offered by the card. Then the card must wait for a command from the terminal relating to the service of the application that the terminal wishes to use, in order to transmit the data of said service to the terminal, which data is stored in the card. The command from the terminal is established under the control of the user of the terminal, or of an entity from the world outside the card connected to the terminal.

As shown in FIG. 1, a known method for communicating services between the card and the terminal comprises steps E1 to E8.

The first step E1 indicates that a user of the terminal or the terminal itself, into which the microcontroller card is inserted, wishes to access a service of an application stored in the card. The terminal, acting as a customer, transmits a command to the card for having the application selected in step E2. This command is, for example, the standardized "SELECT" command. Following the command, the card transmits, in step E3, an acknowledgement status message to the terminal for the purpose of acknowledging the command of the terminal. The first status message comprises header fields only; e.g. the first message includes two bytes indicating that the command has succeeded, i.e. that the application exists in the card, or that the command has failed, i.e. that an anomaly has occurred or that the application is absent from the card. The first status message is, for example, the hexadecimal value 0x9000 in compliance with the ISO 7816 Standard. The message does not include any data field to be transmitted to the terminal so long as said terminal has not requested such data. In the next step E4, the terminal interrogates (polls) the card about its status periodically, e.g. every 500 milliseconds (ms). If the card wishes to transmit data to the terminal, the card transmits to the terminal, during step E5, a second status message that indicates that the card has one or more services to be declared in relation to the application. The second status message is, for example, the hexadecimal value 0x61xx in compliance with the ISO 7816 Standard. On receiving said second message, the terminal transmits to the card a command asking the card to transmit data identifying the service(s) of the application, in step E6. That command is, for example, the standardized ISO 7816 "GET RESPONSE" command. Then, in step E7, the card transmits identification data for identifying the service(s) in one or more messages having a status header.

So long as the service identification data is not disclosed to the terminal, the card cannot dispense the service(s) of the application. Once said data has been transmitted to the terminal, the card no longer transmits it until the next update (reset) of the service(s) of the application.

This method requires a plurality of command and response steps E2 to E7 between the terminal and the card in order for the card to transmit data relating to the services of an application to the terminal. The intermediate steps E3 to E6 defer the communication of the service data from the card to the terminal and more generally to the world outside the card. If the application offers a multitude of services, a plurality of messages are often necessary for identifying the services, thereby deferring communication of the data by a corresponding length of time.

In another known method implemented in banking systems, available applications are communicated by a microcontroller card of the Europay Mastercard Visa (EMV) type to a terminal. Like the preceding method, that method requires a plurality of command and response exchanges between the terminal and the card in order for the card to transmit data relating to the applications to the terminal.

SUMMARY OF THE INVENTION

An object of the invention is, in a microcontroller card, to reduce the time taken for a terminal to access the application service data, and thus to communicate services rapidly from the card to the world outside said card.

To achieve this object, a method for communicating one or more services of an application stored in a microcontroller card to a terminal, wherein, immediately after each selection of the application, the terminal transmits a "select" command identifying the selected application to the card, is characterized in that it comprises selecting, in the card, active services from among services associated with the application, after the "select" command, in order to compile dynamically a list of identification data for identifying the active services, and transmitting a response message including the identification data for identifying the active services from the card to the terminal.

In the meaning of the invention, an application is associated with one or more services.

The method of the invention makes it possible for a direct exchange of data of the command-response type to take place in both directions between the terminal and the card, which is impossible in the above-presented known system.

The identification data relating to services of an application and that is stored in the microcontroller card is thus transmitted immediately to the terminal without the terminal having to send commands for discovering one service at a time.

The user of the terminal becomes aware of all of the services proposed by the same application through a single command.

The method of the invention thus comprises a minimized number of steps of exchange between the card and the terminal for transmitting data from the card to the terminal. The known method, as presented above, executes five steps of exchange between the card and the terminal before the card can transfer data to the terminal.

According to a characteristic of the invention, while selecting the active services associated with the application, the method includes verifying the activity of the services in such a manner as to detect the active services and such as to read the identification data for identifying the active services so as to compile the list dynamically.

According to another characteristic of the invention, after transmitting a response message including the identification data for identifying the active services associated with the application from the card to the terminal, provision is made to analyze said identification data so as to communicate the active services associated with the application and identified by the identification data.

The invention also provides a system for communicating one or more services of an application stored in a microcontroller card to a terminal, the terminal transmitting a "select" command identifying the selected application to the card immediately after each application selection. The system is characterized in that the card includes means for selecting active services from among services associated with the application, after the "select" command, in order to compile dynamically a list of identification data for identifying the active services, and in order to transmit a response message including the identification data for identifying the active services from the card to the terminal.

Preferably, the terminal includes means for analyzing the identification data for identifying the response message in order to communicate the active services associated with the application and identified by the identification data.

The elements that are the means for selecting and the means for analyzing make it possible for direct both-way exchange of data of the command-response type to take place, which is not possible in the known communication system presented above.

The means for selecting the active services indirectly access the various services of the application selected by the terminal, thereby avoiding the need for the user of the terminal or for the terminal itself to direct multiple searches and commands to the card for each service or group of services of an application. The terminal can, in response to a command, receive identification data for identifying all of the services of a single application that are stored in the card.

According to another characteristic of the invention, the response message comprises two header first fields indicating any presence of other fields, a third field indicating the length of a fourth field, and a fourth field including the identification data for identifying the active services associated with the selected application.

The terminal thus directly accesses the applications and indirectly accesses the services associated with each application.

The invention also provides a microcontroller card for communicating one or more services of an application to a terminal that has transmitted a "select" command identifying the application to the card immediately after each selection of the application. The card is characterized in that it includes means for selecting active services from among services associated with the application, after the "select" command, in order to compile dynamically a list of identification data for identifying the active services, and in order to transmit a response message including the identification data for identifying the active services to the terminal.

According to another characteristic of the card, it includes a first software layer dedicated to the applications stored in the card, and a second software layer dedicated to the services stored in the card, each application and each service including an interface for interfacing the applications and the services having a common format.

BRIEF DESCRIPTION OF THE DRAWINGS

Other characteristics and advantages of the present invention will appear more clearly on reading the following description of a preferred implementation of the invention, given by way of non-limiting example, and with reference to the corresponding accompanying drawings, in which.

DETAILED DESCRIPTION

Figure 1:
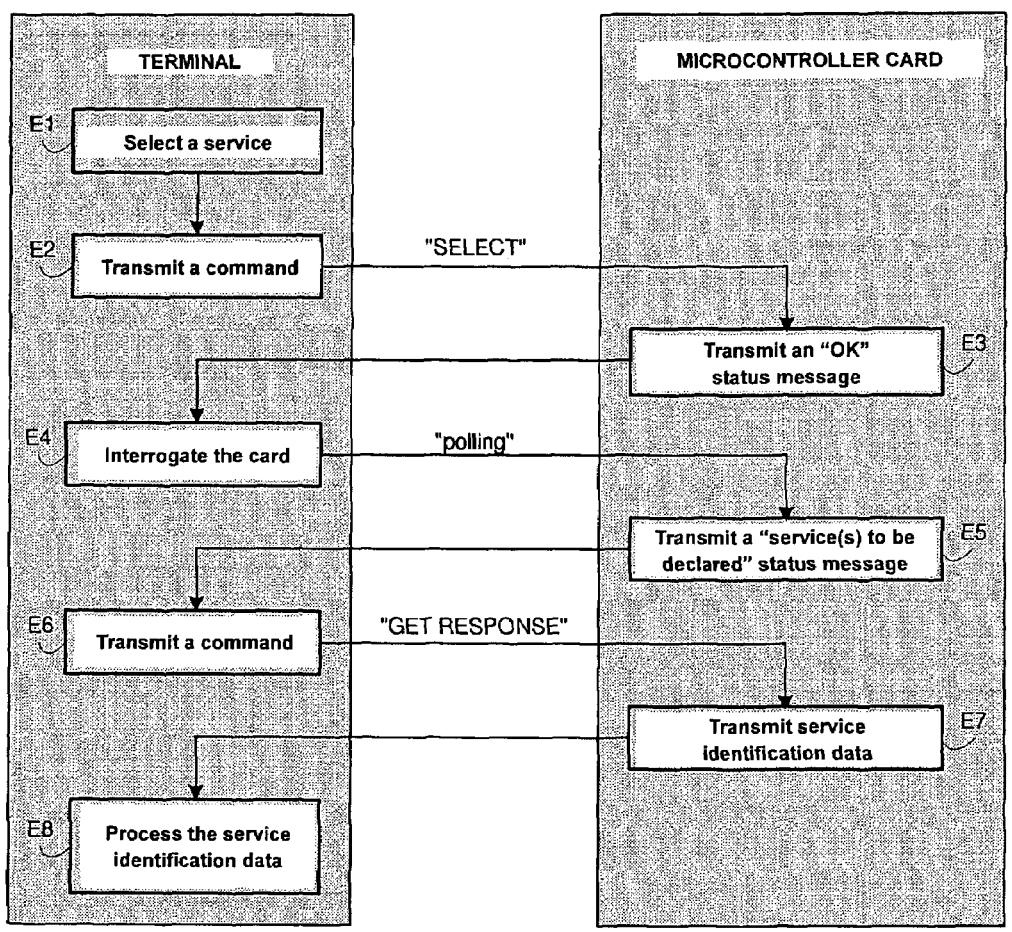
FIG. 1, to which reference is made above, shows an algorithm of the known method for communicating services.
Figure 2:
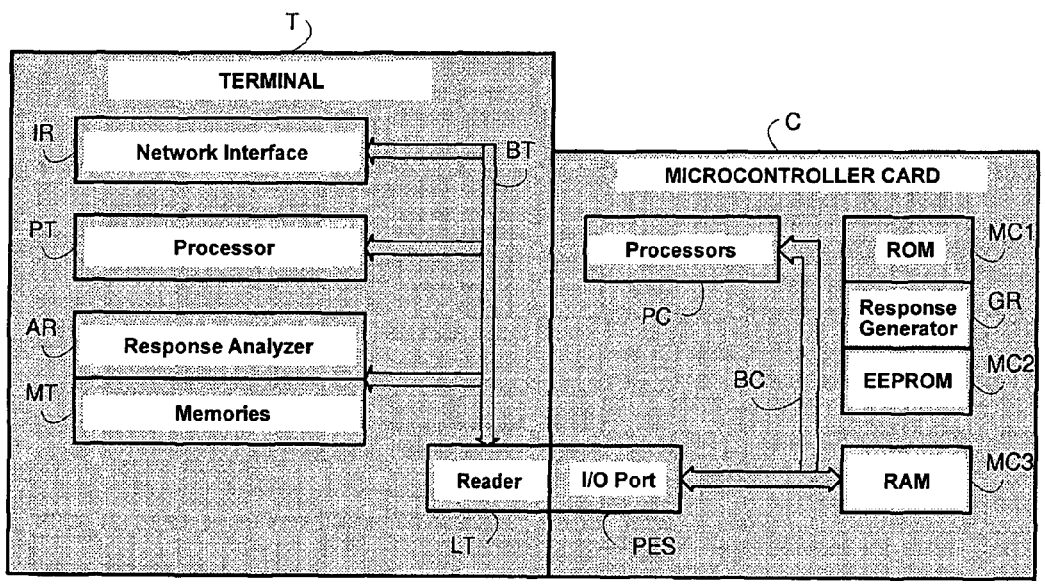
FIG. 2 is a block diagram of an embodiment of a system of the invention for communicating application services.

FIG. 2 shows a communication system of the invention comprising at least one terminal T and a microcontroller card C.

The terminal T includes a processor PT, memories MT, and a microcontroller card reader LT. The reader LT receives the microcontroller card at least in part, with or without electrical contact. The terminal T can also include a network interface IR for communicating with the outside world. For example, the network interface is a radio interface when the terminal is a mobile in a digital cellular radiocommunications network of the GSM or UMTS type. In another example, the network interface includes a modem for communicating with a Web server via the Internet, or with a private server via a leased or specialized link. The various elements of the terminal are interconnected by a both-way bus BT. The terminal T includes a response analyzer AR in the form of a software module that is included in the memories MT. The analyzer AR decodes and analyzes a message transmitted by the microcontroller card C and including application service data stored in the card C.

As is known, the microcontroller card C, also referred to as a "smart card" or as an "integrated circuit card", includes mainly a processor PC, three memories MC1 to MC3 and an input/output port PES that is connectable to the reader LT, with or without electrical contact, in order to exchange commands and responses between the terminal T and the card C. The various elements of the card are interconnected via a both-way bus BC.

The memory M1 is of the Read-Only Memory (ROM) type and includes the operating system of the card and a virtual machine on which the operating system is based. Authentication, communication, and application algorithms are implemented in the memory M1. The memory M2 is a nonvolatile memory of the Electrically Erasable Programmable Read-Only Memory (EEPROM) type containing characteristics associated with the user such as an identifier of a user possessing the card, a subscription profile, a confidential code or Personal Identity Number (PIN), etc. The memory M3 is a Random Access Memory (RAM) serving for processing the data to be exchanged between the processor PC and the card C and the processor PT included in the terminal T.

In the invention, a response generator GR is included in the form of a software module in the memories MC1 and MC2. The response generator verifies the activity of services associated with an application that has been selected by the terminal T in order to compile dynamically a list of data for identifying the active services. The response generator GR also formats a response message to be transmitted to the terminal T and including the list of data for identifying the active services associated with the application.

The card is preferably a multi-application card and it includes a virtual machine that can be implemented using Javacard technology and that can be controlled by the processor of the microcontroller card C. Each application is then an applet which, via the interfacing, polls one or more respective services depending on the request from an outside user, e.g. via the keyboard or keypad of the terminal T, as a bank terminal or as a mobile terminal, connected to the microcontroller card.

Figure 3:
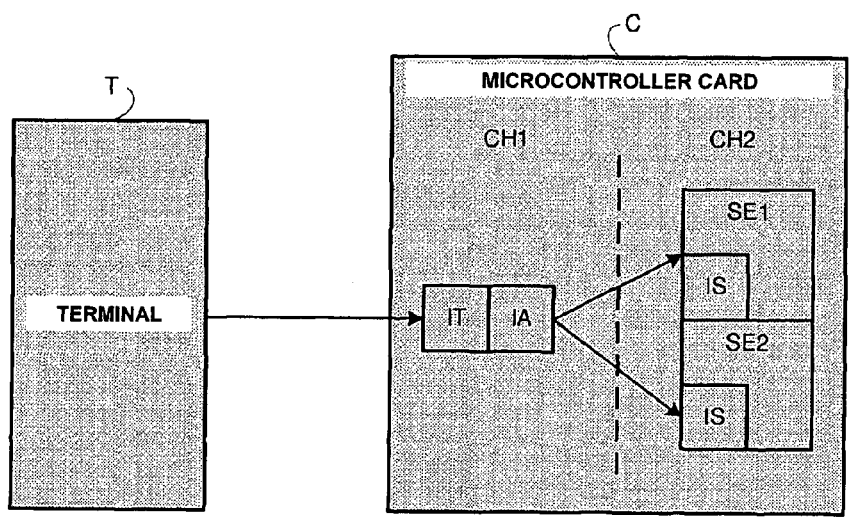
FIGS. 3 and 4 show the interfacing linking up applications and services of the invention.
Figure 4:
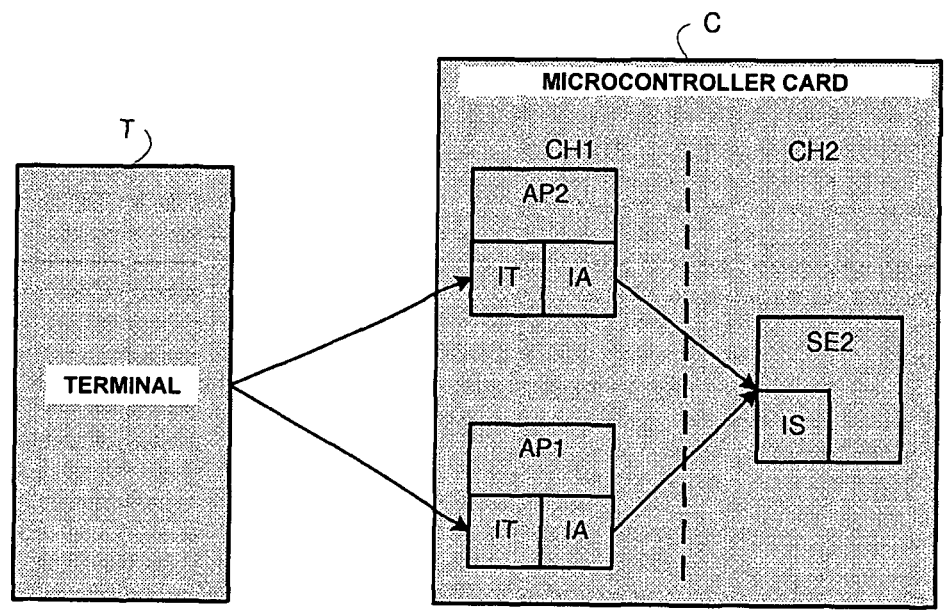

As shown in FIGS. 3 and 4, the software architecture of the card C comprises two software layers CH1 and CH2. The first layer CH1 is dedicated to the applications AP stored in the card. Each application includes an interface IT for interfacing by means of commands and responses directly with the terminal T, or, via the terminal, with an entity outside the card. The second layer CH2 is dedicated to the services SE stored in the card. The data for identifying a service that is associated in computer technology terms with an application constitutes a sub-identifier of an identifier of the application;

Le terminal T or an outside entity indirectly accesses the services associated with an application that has been selected via said application and via the response generator. Interfaces IA and IS are respectively provided in each service SE and in each application AP for the purpose of interfacing services SE and applications AP that have a common connection format. In FIG. 3, an application AP is associated with two services SE1 and SE2. When a new service SE is to be installed in the card C, it is declared with one or more applications AP1, 1P2 having a format in common with the service, via respective interfaces IA and IS of said applications and of said service, as shown in FIG. 4.

The interfaces IA and IS direct the response generator GR towards the service associated with an application. As shown in FIG. 3, one or more services SE1, SE2 interfaced with an application AP are activated and deactivated by commands coming from the terminal or from an outside entity, or indeed by the application itself. Activation, inactivation, installation, de-installation, adding, and erasing services relative to one or more applications change dynamically over a session between the card and the terminal.

In order to enable the invention to be understood more clearly, a plurality of installations of applications (applets) with their associated services are presented below. The microcontroller card can propose various types of applications that are mutually independent or otherwise and that are stored in the card C.

In a first implementation, a plurality of independent applications stored in the microprocessor card each propose a single service. For example, a banking card application manages a service for managing a bank account, and an electronic purse application manages a service for managing a purse. These services are often incorporated directly in their applications. In another example, one of the applications dispenses secure access to a personal computer, and the other application dispenses secure access to premises.

In a second implementation shown in FIG. 3, a single Internet service application AP is implemented in the microprocessor card and it manages a non-secure Web page provider service SE1 and a secure Web page provider service SE2. In another example, an application manages a plurality of user accounts depending on respective ones of a plurality of different services in the card.

In a third implementation, shown in FIG. 4, a common service SE is dispensed by a plurality of different applications AP1, AP2 implemented in the microcontroller card. For example, partner companies each access a customer loyalty application. Said customer loyalty applications propose a common loyalty points management service. In another example, a service for encrypting an electronic signature with personal data of the holder of the card is accessible by a plurality of applications provided that they are so authorized by a certification server via a link through the terminal.

Figure 5:
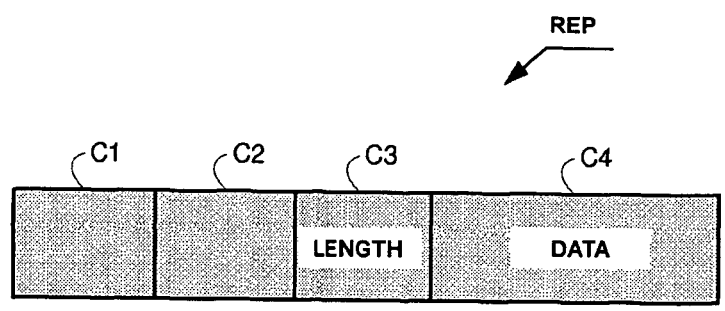
FIG. 5 shows a partially proprietary response message in an implementation of the invention.

FIG. 5 shows the structure of a response message REP transmitted by the card C to the terminal T. The message is partially proprietary and it is made up of four fields C1 to C4. The first two fields C1 and C2 constitute the header of the message. The third field C3 indicates the length of the data to be transmitted. The fourth field C4 contains identification data for identifying active services to be transmitted to the terminal T. The data includes identification information or a list recapitulating all of the active services associated with an application designated in a prior command from the terminal.

The response message REP of the invention uses, for example, the ISO 7816 Standard relating to identification cards and integrated circuit cards without modifying the physical structure of the terminals and of the cards.

The first two fields C1 and C2 are standardized and describe the contents of the following fields C3 and C4. For example, a SELECT command requested previously by the terminal requires, in return, data having a file format. In another example, the hexadecimal value 0x85 of the ISO 7816 Standard indicates that the card is transmitting data that bears no relation to the file format in response to the command from the terminal. The third and fourth fields C3 and C4 of the message are proprietary fields which, for example, include port numbers or addresses identifying services of a banking application that has been selected by the terminal. When the hexadecimal value of the identifier of a first service is 0x2760 and when the value of the identifier of a second service is 0x27CB, the response message REP is as follows:

| C1 | C2 | C3 | C4 |
|---|---|---|---|
| 0x62 | 0x85 | 0x04 | 0x27 0x60 0x27 0xCB |

Figure 6:
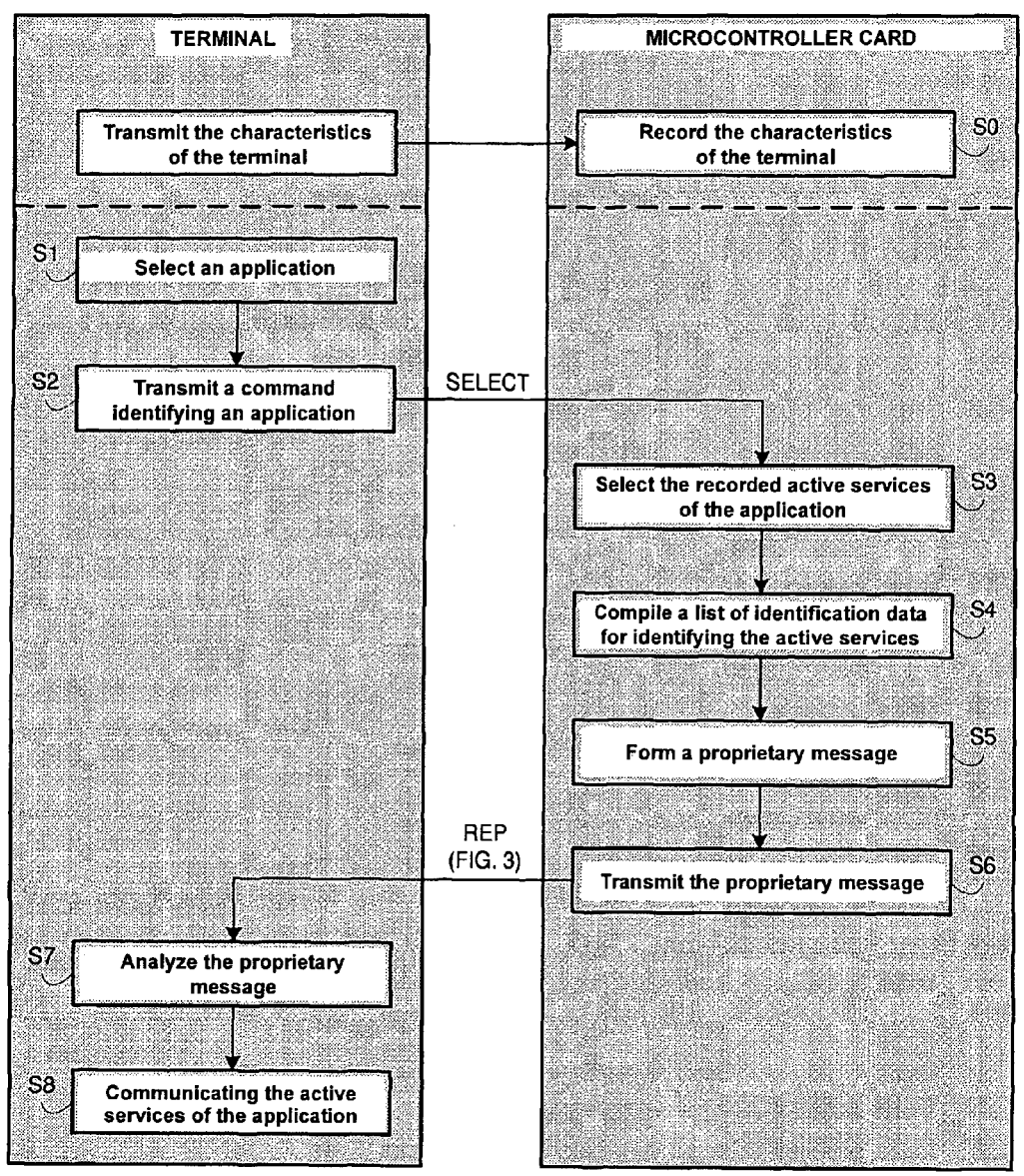
FIG. 6 is an algorithm of an implementation of a method of the invention for communicating application services.

As shown in FIG. 6, the communication method of the invention comprises steps S1 to S8. The method is implemented both in the terminal T and in, the microcontroller card C so as to communicate all of the services associated with an application, the services and the application being stored at least in the memory MC2 of the microcontroller card C. The method for communicating services is triggered while the application is being selected by the terminal. This selection can result from initializing or updating the application and/or at least one of the services thereof in the card. After the selection, the card transmits identification data to the terminal for identifying all of the active services of the application until the application is next selected.

In step S1, the user of the terminal, or any customer entity authorized through the terminal selects an application stored in the card C, e.g. by means of a form or of an access page. The terminal T then establishes a SELECT command for identifying and interrogating the selected application. The SELECT command is transmitted from the terminal T to the card C through the reader LT and through the input/output port PES in step S2.

After receiving the SELECT command, the response generator GR selects, in step S3, the active services from among the inactive and active services stored in the memory MC2 of the card and associated with the application, in order to compile a list of data dynamically in step S4, which data identifies said active services. Selection of the active services comprises verification of the activity of the services associated with the application so as to detect the services that are active, e.g. by reading the status of an activity/inactivity indicator bit associated with the data for identifying each service in the memory MC2, and so as to read the identification data identifying the services that are active. The response generator GR dynamically compiles the list with the identification data identifying the active services, and records the compiled list in the memory MC2.

During step S5, the response generator forms a partially proprietary response message REP, as described with reference to FIG. 5, comprising the data included in the previously compiled list, which data identifies all of the active services of the selected application. Then, in step S6, the card C transmits the response message REP to the terminal T via the input/output port PES and via the reader LT to the response analyzer AR in the terminal T. The analyzer AR analyzes the response message REP so as to extract and so as to decode the data identifying all of the services of the application selected in step S7. Finally, in step S8, the data identifying the active services of the selected application is communicated by storing said data in the memories MT of the terminal T and/or by transmitting it to authorized entities via the network interface IR.

The response generator GR incorporated in the card C and the response analyzer AR incorporated in the terminal T contribute, in accordance with the invention, to transferring directly a command with an application being interrogated from the terminal to the card, and to transferring directly a response with the active services of the selected application being identified from the card to the terminal. In addition, the response generator GR in the card contributes with the application to directing the command for each selected application in order to access the services of the application indirectly after a command from the terminal.

In a variant of the method of the invention, while the dynamic list is being compiled by the response generator GR of the card, certain items of data that identify active services that are associated with the application selected by the terminal but that are not transmissible to the terminal can be masked in the list depending on characteristics related to the hardware, to the software, or to the behavior of the terminal or of an outside entity. These characteristics are pre-known to the card which, for example, recorded them on opening a communication session S0 between the terminal and the card, as shown at the top of FIG. 6.

For example, the characteristics of the terminal relate to the characteristics of the user interface concerning the screen of the terminal, or of specific peripherals such as a printer. In another example relating to behavior characteristics, an application bans a terminal from communicating an active service, such as a service for opening a secure Web page, if the terminal is not very secure.

The invention claimed is:

1. A method for communicating one or more services of an application stored in a microcontroller card to a terminal, said method comprising the steps of:
   receiving, in the card, a "select" command identifying an application on said card, said application having been selected from a plurality of stored applications;
   selecting, in the card, active services from among services associated with the selected application in response to receipt of the "select" command;
   dynamically compiling a list of identification data for identifying the active services associated with the selected application; and
   transmitting, to the terminal, a response message acknowledging receipt of the "select" command, said response message including the identification data for identifying the active services associated with the selected application.

2. A method according to claim 1, wherein the step of selecting active services associated with the selected application comprises verifying the activity of the services in such a manner as to detect the active services and to read the identification data for identifying the active services so as to compile the list dynamically.

3. A method according to claim 1, comprising, after transmitting a response message including the identification data for identifying the active services associated with the selected application from the card to the terminal, a further step of analyzing said identification data in the terminal so as to communicate the active services associated with the application and identified by the identification data.

4. A method according to claim 1, wherein the list of identification data for identifying the active services is compiled as a function of characteristics of the terminal that are pre-known to the card by masking, in said list, items of identification data that identify active services that are not transmissible to the terminal.

5. A system for communicating one or more services of an application comprising:
   a microcontroller card storing said one or more services; and
   a terminal, wherein:
      the terminal transmits a "select" command identifying a selected application to the card after selection of an application, and
      the card, upon receiving the "select" command from the terminal, selects active services from among services associated with the selected application, dynamically compiles a list of identification data for identifying the active services associated with the selected application, and transmits a response message including the identification data for identifying the active services associated with the selected application from the card to the terminal.

6. A system according to claim 5, wherein the terminal functions to analyze said identification data in the response message in order to communicate the active services associated with the selected application and identified by the identification data.

7. A system according to claim 5, wherein the response message comprises two initial header fields indicating any presence of other fields, a third field indicating the length of a fourth field, and a fourth field including the identification data for identifying the active services associated with the selected application.

8. A system according to claim 5, wherein one or more applications are associated with a service.

9. A microcontroller card for communicating one or more services of an application to a terminal that has transmitted a "select" command identifying the application to the card after selection of the application, said microcontroller card comprising:
 a processor that receives the "select" command identifying an application on said card, selects active services from among services associated with the selected application, dynamically compiles a list of identification data for identifying the active services associated with the selected application, and transmits a response message including the identification data for identifying the active services associated with the selected application to the terminal.

10. A microcontroller card according to claim 9, further comprising including a first software layer dedicated to the applications stored in the card, and a second software layer dedicated to the services stored in the card, each application and each service including an interface for interfacing the applications and the services having a common format.

11. A method according to claim 2, comprising, after transmitting a response message including the identification data for identifying the active services associated with the selected application from the card to the terminal, a further step of analyzing said identification data in the terminal so as to communicate the active services associated with the selected application and identified by the identification data.

12. A method according to claim 2, wherein the list of identification data for identifying the active services associated with the selected application is compiled as a function of characteristics of the terminal that are pre-known to the card by masking, in said list, items of identification data that identify active services that are not transmissible to the terminal.

13. A method according to claim 3, wherein the list of identification data for identifying the active services associated with the selected application is compiled as a function of characteristics of the terminal that are pre-known to the card by masking, in said list, items of identification data that identify active services that are not transmissible to the terminal.

14. A system according to claim 6, wherein the response message comprises two initial header fields indicating any presence of other fields, a third field indicating the length of a fourth field, and a fourth field including the identification data for identifying the active services associated with the selected application.

15. A system according to claim 6, wherein one or more applications are associated with a service.

16. A system according to claim 7, wherein one or more applications are associated with a service.

* * * * *